(12) United States Patent
Hesse et al.

(10) Patent No.: US 9,676,666 B2
(45) Date of Patent: Jun. 13, 2017

(54) HARDENING ACCELERATOR CONTAINING ETTRINGITE AND CALCIUM SILICATE HYDRATE

(71) Applicant: BASF Construction Solutions GmbH, Trostbert (DE)

(72) Inventors: Christoph Hesse, Ebersberg (DE); Niklas Loges, Pittenhart (DE)

(73) Assignee: BASF Construction Solutions GMBH (DE)

( * ) Notice: Subject to any disclaimer, the term of this patent is extended or adjusted under 35 U.S.C. 154(b) by 0 days.

(21) Appl. No.: 14/914,993

(22) PCT Filed: Aug. 22, 2014

(86) PCT No.: PCT/EP2014/067906
§ 371 (c)(1),
(2) Date: Feb. 26, 2016

(87) PCT Pub. No.: WO2015/028402
PCT Pub. Date: Mar. 5, 2015

(65) Prior Publication Data
US 2016/0207831 A1   Jul. 21, 2016

(30) Foreign Application Priority Data

Aug. 29, 2013 (EP) .................... 13182124

(51) Int. Cl.
| | | |
|---|---|---|
| *C04B 22/14* | (2006.01) | |
| *C04B 28/02* | (2006.01) | |
| *C04B 28/14* | (2006.01) | |
| *C04B 28/16* | (2006.01) | |
| *C04B 40/00* | (2006.01) | |
| *C04B 22/08* | (2006.01) | |
| *C04B 24/24* | (2006.01) | |
| *C04B 24/26* | (2006.01) | |
| *C04B 28/04* | (2006.01) | |
| *C04B 103/14* | (2006.01) | |
| *C04B 111/00* | (2006.01) | |

(52) U.S. Cl.
CPC ............ *C04B 22/142* (2013.01); *C04B 22/08* (2013.01); *C04B 24/246* (2013.01); *C04B 24/2694* (2013.01); *C04B 28/02* (2013.01); *C04B 28/04* (2013.01); *C04B 28/145* (2013.01); *C04B 28/16* (2013.01); *C04B 40/0039* (2013.01); *C04B 40/0042* (2013.01); *C04B 2103/14* (2013.01); *C04B 2111/00146* (2013.01); *C04B 2111/00155* (2013.01); *Y02W 30/94* (2015.05)

(58) Field of Classification Search
CPC ..... C04B 22/08; C04B 22/142; C04B 24/246; C04B 24/2694; C04B 28/04; C04B 28/02; C04B 28/145; C04B 28/16; C04B 40/0042; C04B 40/0039; C04B 2111/00146; C04B 2111/00155; C04B 2103/14; Y02W 30/94

See application file for complete search history.

(56) References Cited

U.S. PATENT DOCUMENTS

| 5,158,996 A | 10/1992 | Valenti |
|---|---|---|
| 6,211,317 B1 | 4/2001 | Albrecht et al. |
| 7,842,766 B2 | 11/2010 | Kraus et al. |
| 2010/0003412 A1* | 1/2010 | Weibel ............... C04B 40/0039 427/337 |
| 2011/0269875 A1* | 11/2011 | Nicoleau ............... C04B 28/02 524/2 |
| 2013/0217808 A1 | 8/2013 | Sulser et al. |
| 2014/0199488 A1* | 7/2014 | Alfonso ............... C04B 28/02 427/427 |
| 2016/0023950 A1 | 1/2016 | Weibel |

FOREIGN PATENT DOCUMENTS

| CN | 101337791 A | 1/2009 |
|---|---|---|
| EP | 0271329 A2 | 6/1988 |
| EP | 0753488 A2 | 1/1997 |
| EP | 0894811 A1 | 2/1999 |
| EP | 1138697 A1 | 10/2001 |
| EP | 1851256 A1 | 11/2007 |
| EP | 1878713 A1 | 1/2008 |
| EP | 2463314 A1 | 6/2012 |
| JP | H10279343 A | 10/1998 |
| WO | WO-02/070425 A1 | 9/2002 |
| WO | WO-2006072273 A1 | 7/2006 |
| WO | WO-2006089759 A1 | 8/2006 |
| WO | WO-2010026155 A1 | 3/2010 |
| WO | WO-2012072450 A2 | 6/2012 |

OTHER PUBLICATIONS

International Search Report for PCT/EP2014/067906 mailed Nov. 12, 2014.

* cited by examiner

Primary Examiner — Robert Jones, Jr.
(74) Attorney, Agent, or Firm — Drinker Biddle & Reath LLP

(57) ABSTRACT

The invention concerns a process for the preparation of a calcium silicate hydrate and ettringite containing hardening accelerator composition by reaction of a water-soluble calcium compound, silicate compound, aluminum compound and a sulfate compound, wherein the molar ratio of silicon to sulfate is from 2/1 to 30/1 and the reaction of the four compounds being carried out in the presence of an aqueous solution which contains a comb polymer suitable as a plasticizer for hydraulic binders. Also concerned are the use of said accelerators in building material mixtures, the building material mixtures containing said accelerators and a process for the preparation of a sprayable binder composition in which said accelerators are used.

22 Claims, 2 Drawing Sheets

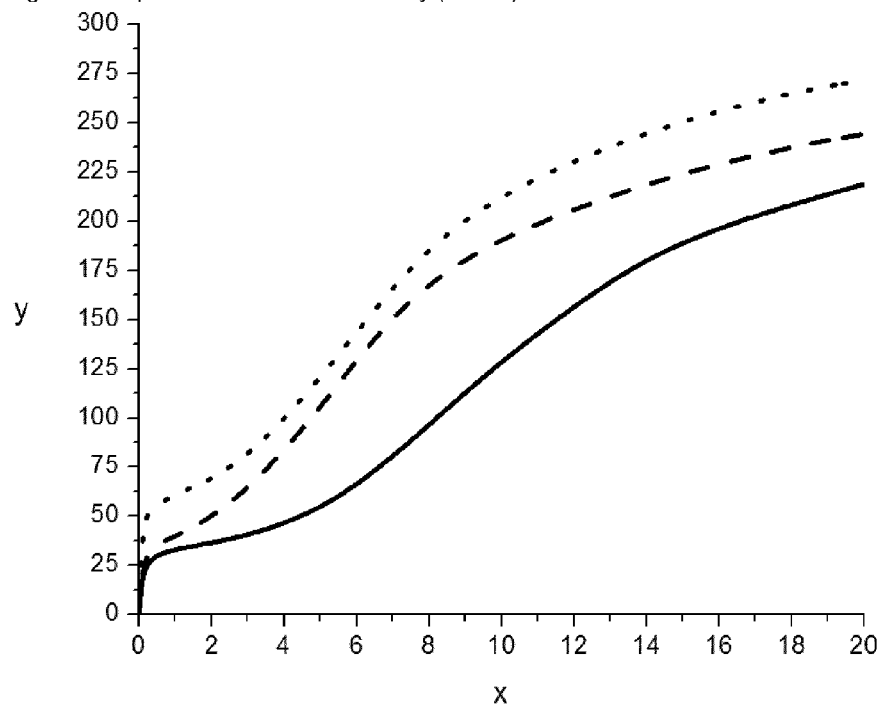
Fig. 1: Examples for heat flow calorimetry (mortar)
x-axis: Time in hours
y-axis: Heat released in J/g cement
Straight line: Reference sample (Mix A) only containing cement, water and tartrate.
Dotted line: Example No. 1
Dashed line: Example No. 10 (comparison example)

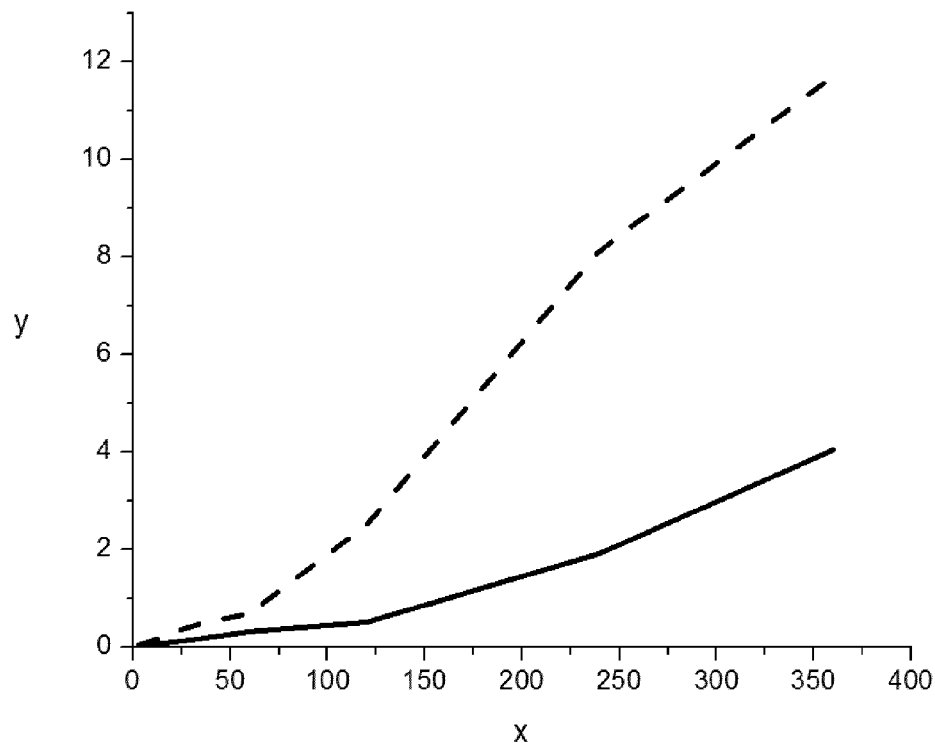
Fig. 2: Compressive strength development (sprayed concrete)
x-axis: Time in minutes
y-axis: Heat released in J/g cement
Straight line: Reference sample containing cement, water and 6 % alkali free accelerator SA167 by weight of the cement.
Dashed line: Sample containing cement, water, 6 % SA167 and 2.4 % Susp-3 (both percentages are by weight of the cement).

HARDENING ACCELERATOR CONTAINING ETTRINGITE AND CALCIUM SILICATE HYDRATE

CROSS-REFERENCE TO RELATED APPLICATIONS

This application is a national stage application (under 35 U.S.C. §371) of PCT/EP2014/067906, filed Aug. 22, 2014, which claims benefit of European Application No. 13182124.1, filed Aug. 29, 2013, both of which are incorporated herein by reference in their entirety.

The present invention concerns a process for the preparation of a calcium silicate hydrate and ettringite containing hardening accelerator composition by reaction of a i) water-soluble calcium compound, ii) water-soluble silicate compound, iii) water-soluble aluminum compound and iv) a water-soluble sulfate compound, wherein the molar ratio of silicon to sulfate is from 2/1 to 30/1, preferably from 5/1 to 20/1, and the reaction of the four water-soluble compounds i) to iv) being carried out in the presence of v) an aqueous solution which contains a water-soluble comb polymer suitable as a plasticizer for hydraulic binders. The invention also concerns the hardening accelerator compositions obtainable by said process, the use of the hardening accelerator in building material mixtures and the building material mixtures containing the hardening accelerator. Also concerned is a process for the preparation of a sprayable binder composition containing an inorganic binder selected from the group of cement, calcium sulfate hemihydrate, anhydrite, slag, preferably ground granulated blast furnace slag, fly ash, silica dust, metakaolin, natural pozzolans and/or calcined oil shale, water, aggregates and a set accelerator, characterized in that a hardening accelerator according to this invention is used.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of cavities which are formed in the concrete body by the excess water which subsequently evaporates leads to significantly poorer mechanical strengths and durabilities.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions.

Furthermore, admixtures for building material mixtures comprising hydraulic binders typically also contain hardening accelerators which shorten the setting time of the hydraulic binder. According to WO 02/070425, calcium silicate hydrate in particular present in dispersed (finely or particularly finely dispersed) form, can be used as such a hardening accelerator.

WO 2010/026155 A1 discloses aqueous suspensions of calcium silicate hydrate, which are used as hardening accelerators for hydraulic binders, for example for cement. Said suspensions are produced in the presence of a polycarboxylate ether (PCE) from a water-soluble calcium compound and a water-soluble silicate compound. The calcium silicate hydrate can optionally contain further dissolved ions, which are preferably provided in the form of dissolved aluminum salts and/or dissolved magnesium salts. The aluminum and magnesium salts can be for example provided in the form of aluminum halogens, aluminum nitrate, aluminum hydroxide and/or aluminum sulphate, respectively magnesium nitrate, magnesium chloride and/or magnesium sulphate. There is no indication in WO 2010/026155 A1 that the suspensions contain ettringite or that a combination of calcium silicate hydrate with aluminum and sulfate would be especially advantageous. WO 2010/026155 A1 does not disclose any specific amounts of aluminum and sulfate.

WO 2012/072450 A2 relates to sprayed concrete and describes a process for the preparation of a sprayable inorganic binder composition containing as main components water, aggregates, inorganic binder and a set accelerator. A cement hydrate products containing component, which can be ettringite or gypsum is added before and/or at the spray nozzle. It has been found that said cement hydrate products can improve the performance of set accelerators in inorganic binder compositions.

The hardening acceleration effect of the calcium silicate hydrate suspensions of the prior art is still considered to be improvable, in particular with respect to the early strength development and the setting behavior of cementitious binder materials. The term early strength development means preferably the strength development within the time frame from 0 to 3 hours after the preparation of the cementitious binder mixture. In particular the term early strength development means in the field of sprayed concrete applications the time frame from 0 to one hour after the preparation of the cementitious binder mixture. The early strength development and the setting behavior of cementitious binder materials are important parameters, which determine in many construction applications the progress of construction work. In the context of this patent application the term cement is preferably defined as comprising Ordinary Portland Cement (OPC) according to DIN EN 197-1 and high alumina cement according to DIN EN 14647. Preferably the terms cementitious binder materials, cementitious binder mixtures, cementitious binder also comprise Ordinary Portland Cement (OPC) according to DIN EN 197-1 and high alumina cement according to DIN EN 14647.

The object of the present invention is to further improve the hardening acceleration effect of the calcium silicate hydrate containing suspensions of the prior art and in particular to improve the early strength development and the setting behaviour of cementitious binder materials.

The object of the invention was solved by a process for the preparation of a calcium silicate hydrate and ettringite containing hardening accelerator composition by reaction of a i) water-soluble calcium compound, ii) water-soluble silicate compound, iii) water-soluble aluminum compound and iv) a water-soluble sulfate compound, wherein the molar ratio of silicon to sulfate is from 2/1 to 30/1 and the reaction of the four water-soluble compounds i) to iv) being carried out in the presence of v) an aqueous solution which contains a water-soluble comb polymer suitable as a plasticizer for hydraulic binders.

The object was also solved by the hardening accelerator compositions obtainable by said process, by the use of a hardening accelerator composition in building material mixtures containing cement, calcium sulfate hemihydrate, anhydrite, slag, preferably ground granulated blast furnace slag, fly ash, silica dust, metakaolin, natural pozzolans and/or calcined oil shale and by building material mixtures containing the hardening accelerators according to this invention and cement, calcium sulfate hemihydrate, anhydrite, slag, preferably ground granulated blast furnace slag, fly ash, silica dust, metakaolin, natural pozzolans and/or calcined oil shale. A process for the preparation of a sprayable binder composition containing an inorganic binder selected from the before mentioned group of binders, water, aggregates and a set accelerator, characterized in that a hardening accelerator composition according to this invention is used, solves also the object of the invention.

A BRIEF DESCRIPTION OF THE FIGURES

FIG. 1 illustrates the heat flow for three selected samples.

FIG. 2 illustrates compressive strength development for samples according to the invention.

The hardening accelerator composition is a hardening accelerator composition, more preferably an aqueous hardening accelerator suspension. The hardening accelerators of this invention contain ettringite and calcium silicate hydrate.

Ettringite is known under the formula $Ca_6[Al(OH)_6]_2(SO_4)_3 \cdot 26\ H_2O$. It is formed under alkaline conditions from calcium salts, aluminum salts and sulfates.

Calcium silicate hydrate is also formed under alkaline conditions from calcium salts and silicates. The content of water in the form of hydrate can vary, also the ratio of calcium to silicon. Typically the molar ratio of calcium to silicon in calcium silicate hydrates is in the range from 0.6 to 2, preferably 1.0 to 1.8. Typically the molar ratio of calcium to water in calcium silicate hydrates is from 0.6 to 6, preferably 0.6 to 3, more preferably 0.8 to 2. Said ranges are similar to those found for example in calcium silicate hydrate phases, which are formed during the hydration of cement.

Typically the calcium silicate hydrate in the composition, preferably aqueous hardening accelerator suspension, is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, $\alpha$-$C_2SH$, dellaite, jaffeite, rosenhahnite, killalaite and/or suolunite.

In principle, only relatively slightly water-soluble compounds are suitable in the process of this invention as i) water-soluble calcium compounds, ii) water-soluble silicate compounds, iii) water-soluble aluminum compounds and iv) water-soluble sulfate compound, although readily water-soluble compounds (which dissolve completely or virtually completely in water) are preferred in each case. However, it must be ensured there is a sufficient reactivity for the reaction in the aqueous environment with the corresponding reactant (compounds i) to iv)). It is to be assumed that the reaction takes place in aqueous solution but more or less water-insoluble inorganic compounds (calcium silicate hydrate and ettringite) are present as reaction products.

The solubility in water of the reactants i) calcium from the water-soluble calcium compound is preferably higher than 0.005 mol/l, the solubility in water of silicon from the ii) water-soluble silicate compound is preferably higher than 0.005 mol/l, the solubility in water of aluminum from the iii) water-soluble aluminum compound is preferably higher than 0.005 mol/l and the solubility in water of sulfate from the iv) water-soluble sulfate compound is preferably higher than 0.005 mol/l. In each case the solubility is measured at a temperature of 20° C. and normal pressure. The solubility in water (measured at a temperature of 20° C. and normal pressure) of the v) comb polymer suitable as a plasticizer for hydraulic binders is preferably higher than 100 g/l and below 800 g/l. More preferably it is higher than 200 g/l and below 700 g/l.

Compounds i) to iv) are not especially limited, preferable as inorganic compounds i) to iv) are salts of calcium, silicates, aluminum salts and sulfate salts. Each raw material i) to iv) can preferably be introduced by one or more than one distinct source(s), which only introduces the respective raw material. For example i) would be introduced by a calcium salt not comprising any other raw materials out of the list of ii), iii) and iv). Calcium nitrate would be for example only a source of i) calcium, or aluminum hydroxide would only be a source of iii) aluminum. It is apparent that in this case at least four raw materials are needed.

It is also possible that one raw material can be introduced by more than one sources, for example in the case of i), calcium can be introduced for example by a mixture of calcium nitrate and calcium chloride.

On the other side it is also possible that the sources of compounds i), ii), iii) and iv) overlap, for example calcium sulfate can be source of i) and at the same time be source of iv), in an analogous way aluminum sulfate can be source of iii) and iv).

More preferably the compounds i), ii), iii) and iv) are sourced from at least three different raw materials, for example from calcium sulfate (compound i) and compound iv)), from aluminum sulfate (compound iii) and compound iv)) as a second raw material and from sodium metasilicate ($Na_2SiO_3$) as a third raw material (compound ii). In this case the amounts of sulfate from calcium sulfate and from aluminum sulfate add up the total amount of iv) sulfate.

It is not preferred that the compounds i) to iv) are sourced from one single raw material, which would contain all compounds i) to iv). Preferably the hardening accelerator compositions according to this invention are not produced from one raw material, which contains the components i), ii), iii) and iv).

In the context of the present invention, the v) comb polymers are preferably to be understood as (co)polymers which have relatively long polyalkylene glycol, preferably polyethylene glycol, side chains (having a molecular weight of in each case at least 200 g/mol, particularly preferable at least 400 g/mol, most preferably at least 1,100 g/mol) on a linear main chain at more or less regular intervals and have anionic and/or anionogenic groups. Most preferably the polyalkylene glycol comprises ethylene glycol and propylene glycol as repeating units. Anionogenic groups are chemical functionalities, which are capable to produce anionic groups in a chemical reaction. For example in an acid-base reaction the anionic groups can be released from for example anionogenic groups like carboxylic acid groups, phosphoric acid ester groups, phosphonic acid ester groups and sulphonic acid groups. Furthermore anionogenic groups can be anhydrides (e.g. maleic acid anhydride) which react to the respective acid salt by way of hydrolysis, preferably under alkaline conditions.

The lengths of these side chains are frequently approximately equal but may also differ greatly from each other (for example when polyether macromonomers having side chains of different length are incorporated in the form of polymerized units). Such polymers can be obtained for example by a radical polymerization of acid monomers and polyether macromonomers. Esterification and/or amidation of poly (meth)acrylic acid and similar (co)polymers like for example acrylic/maleic acid copolymers with suitable monohydroxy functional, respectively monoamino functional poly alkylene glycols, preferably alkyl polyethylene glycols is an alternative route to such comb polymers. Comb polymers obtainable by esterification and/or amidation of poly (meth)acrylic acid are for example described in EP1138697B1.

Preferred anionic groups of the comb polymer are sulphates, sulphonates, carboxylates, phosphoric acid ester and/or phosphoric acid ester salts. The carboxylates and phosphoric acid ester and/or phosphoric acid ester salts are preferred. The anionic groups can also be phosphonic acid ester and/or phosphonic acid ester salts. The anionic groups in the comb polymer can be the same or different.

In the case of phosphoric esters or phosphonic esters, they may also include the corresponding diesters and triesters and also the monoester of diphosphoric acid. These esters come about in general during the esterification of organic alcohols with phosphoric acid, polyphosphoric acid, phosphorus oxides, phosphorus halides or phosphorus oxyhalides, and/or the corresponding phosphonic acid compounds, alongside the monoester, in different proportions, as for example 5-30 mol % of diester and 1-15 mol % of triester and also 2-20 mol % of the monoester of diphosphoric acid.

Preferably the average molecular weight $M_w$ as determined by gel permeation chromatography (GPC) of the water-soluble comb-polymer suitable as a plasticizer for hydraulic binders is from 5,000 to 200,000 g/mol, more preferably from 10,000 to 80,000 g/mol, most preferably from 20,000 to 70,000 g/mol. The polymers were analysed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of acetonitrile; injection volume 100 µl; flowrate 0.5 ml/min). The calibration for determining the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

Examples for comb polymers according to this invention are polycarboxylic acid ethers (PCE), polyphosphate ethers (PPE) and polycondensates basing on alkoxylated aromates and on aromates comprising a phosphate group. Preferable are polycarboxylic acid ethers (PCE) and polyphosphate ethers (PPE). Preferably the comb polymers according to this invention (e.g. polycarboxylic acid ethers (PCE) and polyphosphate ethers (PPE)) are obtained by a radical copolymerization from ethylenically unsaturated monomers with a polymerizable carbon carbon double bond.

Polycarboxylic acid ethers (PCE) and polyphosphate ethers (PPE) are characterized by the presence of a polymer backbone of carbon atoms and polyether side chains. In the case of polycarboxylic acid ethers (PCE) the anionic group is a carboxylate or a group capable to release a carboxylate and in the case of polyphosphate ethers (PPE) the anionic group is a phosphoric acid ester salt or a group capable to release a phosphoric acid ester salt.

In a preferred embodiment, the water-soluble comb polymer suitable as a plasticizer for hydraulic binders is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. The polyether macromonomer preferably comprises repeating units of ethylene glycol and propylene glycol. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth)acrylic acid).

In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidon, butadiene, vinyl proprionate, unsaturated hydrocarbons like for example ethylene, propylene and/or (iso)butylene. This listing is a non-exhaustive enumeration. Preferable are monomers with not more than one carbon double bond.

In a preferred embodiment of the invention the water-soluble comb-polymer suitable as plasticizer for hydraulic binders is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

Preferably the water-soluble comb polymer suitable as a plasticizer for hydraulic binders fulfils the requirements of the industrial standard EN 934-2 (February 2002).

Examples for the compounds i) to v) will be given later in this description.

It is important that the reaction of the inorganic reactants i) to iv) to ettringite and calcium silicate hydrate takes place in the presence of v) an aqueous solution which contains a water-soluble comb polymer suitable as a plasticizer for hydraulic binders. The comb polymer helps in forming fine particles of both calcium silicate hydrate and ettringite. It is supposed that the fine particles are stabilized by the comb polymer and in particular an agglomeration of the freshly formed fine particles is prevented by the presence of the comb polymers.

It is preferred that the mixing of the reactants i) to v) takes place in a high shear environment. The mixing power (energy per time unit) brought to the system in the high shear zone should be preferably in the range of 1 to 15 Watt/liter.

There are several methods of reacting the compounds i) to iv) in the presence of the v) aqueous solution which contains a water-soluble comb polymer suitable as a plasticizer for hydraulic binders. Any method is suitable, which avoids the reaction of the calcium compound i) with the silicate ii) in the absence of the comb polymer v) and avoids the reaction of the calcium compound i) with aluminum iii) and iv) sulfate in the absence of the comb polymer v). For example it would be possible to add the compounds i) to iv) separately to a solution of the comb polymer v). Preferably the addition is done over a period of time at defined rates.

Also it could be possible to prepare for example a mixture of the calcium compound i) with the comb polymer v) and to add to this mixture separately the silicate compound ii), the aluminum compound iii) and the sulfate compound iv). It should be mentioned that especially the compounds aluminum iii) and sulfate iv) are in each case preferably used in the form of aluminum sulfate or other aluminum and sulfate containing salts like basic aluminum hydroxy sulfate.

Preferably the preparation of the calcium silicate hydrate and ettringite containing hardening accelerator composition is carried out by adding separately an aqueous solution of the water-soluble calcium compound i), the water-soluble silicate compound ii) and the water-soluble comb polymer v) to an aqueous solution containing the water-soluble compounds aluminum iii) and sulfate iv). Most preferably the addition is done in a high shear environment using an effective mixing equipment. The mixing power (energy per time unit) brought to the system in the mixing zone should be preferably in the range of 1 to 15 Watt/liter.

More preferably the preparation of the calcium silicate hydrate and ettringite containing hardening accelerator composition is carried out by adding separately an aqueous solution of the water-soluble calcium compound i) and the water-soluble silicate compound ii) to an aqueous solution containing the water-soluble compounds aluminum iii), sulfate iv) and the comb polymer v). Most preferably the addition is done in high shear environment using an effective mixing equipment. The mixing power (energy per time unit) brought to the system in the mixing zone should be preferably in the range of 1 to 15 Watt/liter.

The molar ratio of silicon to sulfate in the hardening accelerator composition is from 2/1 to 30/1, preferably from 2/1 to 26/1, more preferably from 3/1 to 30/1, more preferably from 3.5 to 30/1, most preferably from 5/1 to 13/1. Within these molar limits especially good acceleration effects were found.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However most preferable are aqueous systems without any solvent.

The temperature range in which the process is carried out is not especially limited. Certain limits however are imposed by the physical state of the system. It is preferable to work in the range of 0 to 100° C., more preferable 5 to 80° C. and most preferable 15 to 35° C. It is preferable not to exceed 80° C. The process can be carried out at different pressures, preferably in a range of 1 to 5 bars.

The process of the invention is characterized in that a coprecipitation of calcium silicate hydrate and ettringite takes place in which calcium silicate hydrate and ettringite are formed. Besides calcium silicate hydrate and ettringite by-products are typically formed, which are salts introduced by the counterions from the raw materials i) to iv). For example the use of aluminum sulfate (iii) and iv)), calcium chloride (i)) and sodium metasilicate (ii)) would result in the by-product sodium chloride from the counterions of i) (chloride) and ii) (sodium).

Preferably the ratio of the weight of water-soluble comb polymer suitable as plasticizer for hydraulic binders to the weight of calcium is from 0.5 to 5, more preferably from 0.75 to 3.5, most preferably from 1 to 2.5. It is preferable that a relatively high weight proportion of comb polymer v) versus calcium is used in order to assure that especially fine and as hardening accelerator effective particles of calcium silicate hydrate and ettringite are formed. Said weight proportion is considerably higher than for example in the production of cementitious compositions in which comb polymers v) (typically polycarboxylate ethers) are used as water reducers for improving the compressive strength and the workability of cementitious compositions.

The water-soluble comb polymer suitable as plasticizer for hydraulic binders can be present in its acid form (anionogenic form) or also in totally or partially neutralized form (anionic form) by for example alkaline chemicals (e.g. metal hydroxides, metal oxides, metal carbonates, amines and so on). In this case the acid proton is replaced by a cation equivalent, for example metal cations or also optionally substituted ammonium ions. The ammonium ions can be also for example substituted with organic residues, like alkyl, aromatic, aryl, aralkyl residues and so forth. The substitution is not especially critical. Preferably the cation equivalent is the same or different and is selected independently from each other from alkali metals, earth alkali metals, aluminum, ammonium salts, which can optionally be substituted with hydrocarbon groups.

The molecular formula and the mass of the comb polymer depend therefore on the kind of residue being present at the anionic or anionogenic site (H or different species of cation equivalents). The term cation equivalent means preferably in the case of monovalent species like ammonium or alkali metals the ammonium or alkali metal itself, in the case of multivalent species, the term cation equivalent means the cation divided with the number of its valence. For example the cation equivalent of $Ca^{2+}$ to one proton is ½ calcium, in the case of $Al^{3+}$ the respective cation equivalent would be ⅓ aluminum.

For the purpose of the calculation of the mass of the water-soluble comb polymer suitable as plasticizer for hydraulic binders, the mass of the comb polymer in its acid form is to be used (replacement of possible cation equivalents by H for the purpose of the mass calculation). This definition of the calculation method helps to avoid potential clarity problems and makes sense as it is supposed that the organic part of the polymer contributes mainly to its efficiency as a dispersant for fine particles of ettringite and calcium silicate hydrate. For example if the sodium salt of acrylic acid would be contained in copolymerized form in the water-soluble comb polymer, then the mass of acrylic acid (72 g/mol) and not of the sodium salt would have to be calculated.

If the cation equivalent in the water-soluble comb polymer is calcium, then the way of calculation is the same as mentioned in the before standing text (again the mass of acrylic acid is used), but of course the mass of calcium (contained in the comb polymer) would have to be calculated then as compound i).

Typically the hardening accelerators according to this invention contain a) from 0.02 mol/l to 1.50 mol/l of calcium, preferably from 0.2 to 1.5 mol/l of calcium, more preferably from 0.4 to 1.0 mol/l of calcium.

Typically the hardening accelerators according to this invention contain b) from 0.005 mol/l to 0.75 mol/l of silicon, preferably from 0.05 to 0.75 mol/l of silicon, more preferably from 0.1 to 0.5 mol/l of silicon.

Typically the hardening accelerators according to this invention contain c) from 0.0025 to 0.17 mol/l of aluminum, preferably from 0.025 to 0.17 mol/l of aluminum, more preferably from 0.05 to 0.11 mol/l of aluminum.

Typically from 0.0025 to 0.375 mol/l of c) sulfate are contained, preferably from 0.025 to 0.375 mol/l of sulfate, more preferably from 0.05 to 0.25 mol/l of sulfate.

Preferable is that the water-soluble components i), ii), iii) and iv) are used in amounts that the hardening accelerator composition contains
  a) from 0.02 mol/l to 1.50 mol/l of calcium, from 0.2 to 1.5 mol/l of calcium, more preferably from 0.4 to 1.0 mol/l of calcium,
  b) from 0.005 mol/l to 0.75 mol/l of silicon, preferably from 0.05 to 0.75 mol/l of silicon, more preferably from 0.1 to 0.5 mol/l of silicon,
  c) from 0.0025 to 0.17 mol/l of aluminum, from 0.025 to 0.17 mol/l of aluminum, more preferably from 0.05 to 0.11 mol/l of aluminum,
  d) from 0.0025 to 0.375 mol/l of sulfate, preferably from 0.025 to 0.375 mol/l of sulfate, more preferably from 0.05 to 0.25 mol/l of sulfate.

For the sake of clarification it should be mentioned that the concentration ranges of silicon b) and sulfate d) in the hardening accelerator are subordinate to the higher-ranking requirement that the weight ratio of silicon ii) to sulfate iv) is from 2/1 to 30/1.

Preferably is that the molar ratio of calcium to sulfate is from 8/1 to 30/1. The molar ratio of calcium to sulfate is preferably from 8.2/1 to 20/1, more preferably from 8.2/1 to 15/1. Advantage is that especially good acceleration effects can be obtained in these ranges.

Preferable is that the molar ratio of calcium to aluminum is from 9.1/1 to 30/1. The molar ratio of calcium to aluminum is preferably from 12/1 to 25/1, more preferably from 15/1 to 22/1. Advantage is that especially good acceleration effects can be obtained in these ranges.

Preferable is that the molar ratio of aluminum to sulfate is from 0.3/1 to 1/1. The molar ratio of aluminum to sulfate is preferably from 0.4/1 to 0.9/1, more preferably from 0.5/1 to 0.8/1. Advantage is that especially good acceleration effects can be obtained in these ranges.

Preferable is that the weight percentage of e) water in the hardening accelerator is from 50% to 99%. A high proportion of water is not so economical, whereas a low water content (high solid contents) may lead to difficulties with the storage stability of the emulsions, especially to precipitation problems. Preferably the weight percentage of e) water is from 60% to 90%, most preferably from 70 to 85 weight %.

The i) water-soluble calcium compound is preferably present as calcium chloride, calcium nitrate, calcium formate, calcium acetate, calcium bicarbonate, calcium bromide, calcium hydroxide, calcium sulfamidate, calcium oxide, calcium iodide, calcium lactate, calcium propionate, calcium sulfate, calcium sulfate hemihydrate, calcium sulfate dihydrate and/or calcium methansulfonate.

More preferably the i) water-soluble calcium compound is present as calcium sulfamidate, calcium acetate and/or calcium hydroxide.

Preferable is a process, characterized in that the water-soluble silicate compound ii) is selected from a silicate with the formula m $SiO_2$.n $M_2O$, wherein M is Li, Na, K and/or $NH_4$, m and n are molar numbers and the ratio of m:n is from 0.9 to 4. Preferably the silicate is an alkali metal silicate, more preferably the silicate is an alkali metal silicate and M is Na and/or K.

More preferably the ratio of m:n is from 0.9 to 3.8, most preferably the ratio of m:n is from 0.9 to 3.6.

Preferable is a process, characterized in that the water-soluble aluminum compound iii) is present as aluminum sulfate, basic aluminum sulfate, aluminum nitrate and/or alkaline metal aluminate. Basic aluminum sulfate is preferably defined by the general formula $Al(OH)_a(SO_4)_b$ with a being 3-2b and b being 0.05 to 1.4, preferably 0.05 to 1.0.

The lists of water-soluble aluminum compound iii) and water-soluble sulfate compound iv) overlap by the chemical compound aluminum sulfate. Aluminum sulfate can be used as the water-soluble aluminum compound iii) and the water-soluble sulfate compound iv) at the same time. Additional sources of aluminum and/or sulfate (different from aluminum sulfate) may be used or may be not used. For the purpose of clarification, if aluminum sulfate is used as the source of the iii) aluminum compound and iv) the sulfate compound, then the amount of aluminum and the amount of sulfate in aluminum sulfate have to be calculated as the respective source of water-soluble components iii) and iv).

Preferable is a process, characterized in that the iv) water-soluble sulfate compound is present as aluminum sulfate, alkaline metal sulfate and/or alkaline earth metal sulfate.

Preferable is a process, characterized in that the pH-value is higher than 7, preferably the pH-value is higher than 9, more preferably higher than 10. It is only under neutral conditions or alkaline conditions that calcium silicate hydrate and ettringite can be formed. If the pH value would be too low (acid), the aluminum cations would be stable in their dissolved hydrated form and calcium might at least partially precipitate as calcium sulfate dihydrate.

Preferable is that cement is not used in the process according to this invention. If cement is used and contained in the hardening accelerator composition, then more preferably the weight percentage of cement with respect to the mass of the hardening accelerator composition is lower than 10 weight %, more preferably lower than 5 weight %.

Preferably cement is not used in the process and is not contained in the process product. Preferably the definition of cement in this description comprises Ordinary Portland Cement (OPC) according to DIN EN 197-1 and high alumina cement according to DIN EN 14647. More preferably Ordinary Portland Cement (OPC) according to DIN EN 197-1, high alumina cement according to DIN EN 14647 and calcium sulfoaluminate cement are not used in the process and are not contained in the process product. More preferably inorganic phases of cements are not used in the process according to this invention and are not contained in the production product, most preferably not used are tricalcium silicate ($C_3S$), dicalcium silicate ($C_2S$), calcium silicate (CS), tricalcium aluminate ($C_3A$), dicalcium aluminate ($C_2A$), calcium aluminum silicates and tetracalciumtrialuminumsulfate ($C_4A_3s$).

Cement or inorganic phases of cements create problems as they are hydraulic binders, which harden also in the presence of water and therefore create stability problems of the resulting hardening accelerator suspensions. Also the effect as a hardening accelerator would be lost as the hardening accelerator would react with the cement.

Preferably the water-soluble comb polymer comprises anionic and/or anionogenic groups and polyether side chains, preferably polyethylene glycol side chains. More preferably the polyether side chains comprise ethylene glycol and propylene glycol as repeating units.

Preferably is that the water-soluble comb polymer comprises as anionic or anionogenic group at least one structural unit of the general formulae (Ia), (Ib), (Ic) and/or (Id):

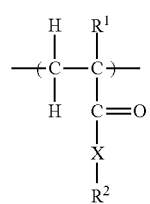
(Ia)

in which
R$^1$ is H or an unbranched or branched C$_1$-C$_4$ alkyl group, CH$_2$COOH or CH$_2$CO—X—R$^2$;
X is NR$^7$—(C$_n$H$_{2n}$) or O—(C$_n$H$_{2n}$) with n=1, 2, 3 or 4, where the nitrogen atom or the oxygen atom is bonded to the CO group;
R$^2$ is PO$_3$M$_2$, O—PO$_3$M$_2$, (C$_6$H$_4$)—PO$_3$M$_2$ or (C$_6$H$_4$)—OPO$_3$M$_2$; or X is a chemical bond and R$^2$ is OM;
R$^7$ is H, C$_1$-C$_6$ alkyl, (C$_n$H$_{2n}$)—OH, —(C$_n$H$_{2n}$)PO$_3$M$_2$, —(C$_n$H$_{2n}$)—O—PO$_3$M$_2$, (C$_6$H$_4$)PO$_3$M$_2$, (C$_6$H$_4$)—OPO$_3$M$_2$ or (C$_n$H$_{2n}$)—O-(AO)$_a$—R$^9$;
A is the same or different and is independently from each other C$_x$H$_{2x}$ with x=2, 3, 4 or 5 or is CH$_2$CH(C$_6$H$_5$),
α is an integer from 1 to 350; and
R$^9$ is H or an unbranched or branched C$_1$-C$_4$-alkyl group;
n is 1, 2, 3, or 4,

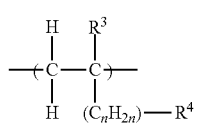
(Ib)

in which
R$^3$ is H or an unbranched or branched C$_1$-C$_4$ alkyl group;
n is 0, 1, 2, 3 or 4;
R$^4$ is PO$_3$M$_2$, or O—PO$_3$M$_2$;

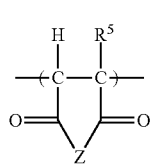
(Ic)

in which
R$^5$ is H or an unbranched or branched C$_1$-C$_4$ alkyl group;
Z is O or NR$^7$;
R$^7$ is H, (C$_n$H$_{2n}$)—OH, (C$_n$H$_{2n}$)—PO$_3$M$_2$, (C$_n$H$_2$O—OPO$_3$M$_2$, (C$_6$H$_4$)—PO$_3$M$_2$, or (C$_6$H$_4$)—OPO$_3$M$_2$, and
n is 1, 2, 3 or 4;

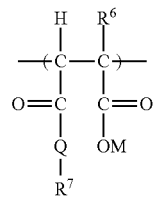
(Id)

in which
R$^6$ is H or an unbranched or branched C$_1$-C$_4$ alkyl group;
Q is NR$^7$ or O;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, (C$_6$H$_4$)OPO$_3$M$_2$, or (C$_n$H$_{2n}$)—O-(AO)$_a$—R$^9$;
A is the same or different and is independently from each other C$_x$H$_{2x}$ with x=2, 3, 4 or 5 or is CH$_2$CH(C$_6$H$_5$),
α is an integer from 1 to 350; and
R$^9$ is H or an unbranched or branched C$_1$-C$_4$-alkyl group,
n is 1, 2, 3, or 4,
and where each M independently of any other is H or a cation equivalent.

Preferably the comb polymer according to this invention comprises at least one structural unit of the general formulae (Ia), (Ib), (Ic) and/or (Id), wherein the structural units (Ia), (Ib), (Ic) and (Id) can be the same or different in the same polymer and also in different polymers.

Preferable the water-soluble comb polymer comprises at least a structural unit of general formula (I), wherein R$^1$ is H or CH$_3$; and/or at least one structural unit of the general formula (Ib), wherein R$^3$ is H or CH$_3$; and/or at least one structural unit of the general formula (Ic), wherein R$^5$ is H or CH$_3$ and Z is O; and/or at least one structural unit of the general formula (Id), wherein R$^6$ is H and Q is O.

Preferably in general formula (Ia) R$^1$ is H or CH$_3$ and XR$^2$ is OM or X is O(C$_n$H$_{2n}$) with n=1, 2, 3 or 4, in particular 2, and R$^2$ is O—PO$_3$M$_2$.

The structural unit according to formula (Ia) is preferably a methacrylic acid- or acrylic acid unit, the structural unit according to formula (Ic) is preferably a maleic anhydride and the structural unit according to formula (Id) is preferably a maleic acid or a maleic acid mono ester unit.

Examples for preferred structural units (Ia) are structural units, which are derived from polymerisation of the following monomers (i): (meth)acrylic acid, hydroxyethyl(meth)acrylic acid phosphoric acid ester, hydroxypropyl(meth)acrylic acid phosphoric acid ester.

Examples for structural units (Ib) are structural units, which are derived from polymerisation of the following monomers (i): vinyl sulphonic acid, vinyl phosphoric acid, vinyl phosphonic acid and vinylstyrene sulphonic acid.

Examples for structural units (Ic) are structural units, which are derived from polymerisation of the following monomers (i): maleic anhydride and maleic imide, preferably maleic anhydride.

Examples for structural units (Id) are structural units, which are derived from polymerisation of the following monomers (i): maleic acid, amide of maleic acid with diethanolamine disphosphate and amide of maleic acid with ethanolamine phosphate.

Preferable is that the water-soluble comb polymer comprises as polyether side chain at least one structural unit of the general formulae (IIa), (IIb), (IIc) and/or (IId):

$$\begin{array}{c} R^{10} \quad R^{11} \\ | \quad \quad | \\ -(C-C)- \\ | \quad \quad | \\ R^{12} \quad (C_nH_{2n})-O-E-G-(AO)_a-R^{13} \end{array} \quad (IIa)$$

in which
$R^{10}$, $R^{11}$ and $R^{12}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is the same or different and is independently from each other $C_xH_{2x}$ with x=2, 3, 4 or 5 or is $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;

$$\begin{array}{c} R^{16} \quad R^{17} \\ | \quad \quad | \\ -(C-C)- \\ | \quad \quad | \\ R^{18} \quad (C_nH_{2n})-O-E-N-(AO)_a-R^{19} \\ \quad \quad \quad \quad \quad \quad \quad \quad | \\ \quad \quad \quad \quad \quad \quad \quad (LO)_d-R^{20} \end{array} \quad (IIb)$$

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is the same or different and is independently from each other $C_xH_{2x}$ with x=2, 3, 4 or 5 or is $CH_2CH(C_6H_5)$, is $C_xH_{2x}$ with x=2, 3, 4 or 5, or is $CH_2CH(C_6H_5)$;
n is 0, 1, 2, 3, 4 and/or 5;
L is the same or different and is independently from each other $C_xH_{2x}$ with x=2, 3, 4 or 5, or is $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched $C_1$-$C_4$ alkyl group; and
n is 0, 1, 2, 3, 4 or 5;

$$\begin{array}{c} R^{21} \quad R^{22} \\ | \quad \quad | \\ -(C-C)- \\ | \quad \quad | \\ R^{23} \quad C-[W-(AO)_a-R^{24}]_y \\ \quad \quad \| \\ \quad \quad O \end{array} \quad (IIc)$$

in which
$R^{21}$, $R^{22}$ and $R^{23}$ independently of one another are H or an unbranched or branched $C_1$-$C_4$ alkyl group;

W is O, $NR^{25}$, or is N;
Y is 1 if W=O or $NR^{25}$, and is 2 if W=N;
A is $C_xH_{2x}$ with x=2, 3, 4 or 5, or is $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

$$\begin{array}{c} R^6 \quad H \\ | \quad | \\ -(C-C)- \\ | \quad | \\ MO-C \quad C-Q-[(AO)_a-R^{24}]_y \\ \| \quad \| \\ O \quad O \end{array} \quad (IId)$$

in which
$R^6$ is H or an unbranched or branched $C_1$-$C_4$ alkyl group;
Q is $NR^{10}$, N or O;
Y is 1 if Q=O or $NR^{10}$ and is 2 if Q=N;
$R^{10}$ is H or an unbranched or branched $C_1$-$C_4$ alkyl group;
$R^{24}$ is H or an unbranched or branched $C_1$-$C_4$-alkyl group;
A is the same or different and is independently from each other $C_xH_{2x}$ with x=2, 3, 4 or 5, or is $CH_2C(C_6H_5)H$;
a is an integer from 2 to 350
and where each M independently of any other is H or a cation equivalent.

The comb polymer is preferably composed of structural units (i) and (ii) derived from
(i) hydroxyethyl acrylate phosphoric esters and/or hydroxyethyl methacrylate phosphoric esters and (ii) $C_1$-$C_4$ alkyl-polyethylene glycol acrylic esters and/or $C_1$-$C_4$ alkyl-polyethylene glycol methacrylic esters; or
(i) acrylic acid and/or methacrylic acid and (ii) $C_1$-$C_4$ alkyl-polyethylene glycol acrylic esters and/or $C_1$-$C_4$ alkyl-polyethylene glycol methacrylic esters; or
(i) acrylic acid, methacrylic acid and/or maleic acid and (ii) vinyloxy-$C_2$-$C_4$ alkylene-polyethylene glycol, allyloxy-polyethylene glycol, methallyloxy-polyethylene glycol and/or isoprenyloxy-polyethylene glycol.

The polymeric dispersants comprising the structural units (I) and (II) are prepared in a conventional way, by means of radical polymerisation, for example. This is described for example in EP0894811, EP1851256, EP2463314, EP0753488.

Preferable is that the water-soluble comb polymer is a polycondensation product comprising structural units (III) and (IV):

$$\begin{array}{c} | \\ T-B-[(AO)_a-R^{25}]_n \\ | \end{array} \quad (III)$$

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is the same or different and is independently from each other $C_xH_{2x}$ with x=2, 3, 4 or 5, or is $CH_2CH(C_6H_5)$;
a is an integer from 1 to 300;

$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb):

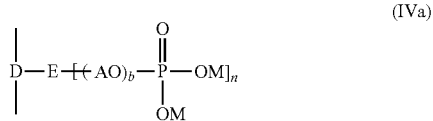

(IVa)

in which
D is a substituted or unsubstituted phenyl or naphthyl radical or a substituted or unsubstituted heteroaromatic radical having 5 to 10 ring atoms, of which 1 or 2 atoms are heteroatoms selected from N, O and S;
E is N, NH or O, with the proviso that n is 2 if E is N and with the proviso that n is 1 if E is NH or O;
A is the same or different and is independently from each other $C_xH_{2x}$ with x=2, 3, 4 or 5, or is $CH_2CH(C_6H_5)$;
b is an integer from 1 to 300
and where each M independently of any other is H or a cation equivalent;

(IVb)

in which
V is a substituted or unsubstituted phenyl or naphthyl radical and is optionally substituted by 1 or two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is independently of any other H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

In the polycondensates the structural units according to the formula (IVa) and/or formula (IVb) can be present. The structural unit (IVa) is preferable.

The structural units T and D in the general formulae (III) and (IV) in the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be selected independently of one another and may also each be derived from a mixture of the stated radicals. The groups B and E independently of one another are preferably O. All structural units A may be identical or different not only within individual polyether side chains but also between different polyether side chains. In one particularly preferred embodiment, A is $C_2H_4$.

In the general formula (III), a is preferably an integer from 3 to 200 and more particularly 5 to 150, and in the general formula (IV) b is preferably an integer from 1 to 300, more particularly 1 to 50 and more preferably 1 to 10. Furthermore, the radicals of the general formulae (III) or (IV) may independently of one another in each case possess the same chain length, in which case a and b are each represented by a number. In general it will be useful for mixtures with different chain lengths to be present, so that the radicals of the structural units in the polycondensation product have different numerical values for a and, independently, for b.

The polycondensation product of the invention frequently has a weight-average molecular weight of 5,000 g/mol to 200,000 g/mol, preferably 10,000 to 100,000 g/mol and more preferably 15,000 to 55,000 g/mol.

The molar ratio of the structural units (III):(IV) is typically 4:1: to 1:15 and preferably 2:1 to 1:10. It is advantageous to have a relatively high fraction of structural units (IV) in the polycondensation product, since a relatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

Preferable is that the calcium silicate hydrate and ettringite containing aqueous hardening accelerator composition is dried in a subsequent process step. Preferably the drying step is spray drying, fluid bed drying, or drum drying. Most preferable is the drying method of spray drying.

The invention also concerns hardening accelerator compositions obtainable by the process according to this invention. Preferably the hardening accelerator compositions are obtained by the process according to this invention.

The products have a good effect in improving the early strength development and setting time of cementitious binder materials. The hardening accelerators are especially effective when used in combination with alkali free accelerators for sprayed concrete applications. Alkali free accelerators contain basically aluminum salt and sulfate as accelerating basic chemicals. Alkali free accelerators are for example described in Xu, Q. & Stark, J.

The chemical action of $Al(OH)_3$ accelerators in the early hydration of Portland cements *ZKG International*, 2008, 61, 1-11.

Preferably the hardening accelerator composition is dosed at to 0.05 to 5.0 weight %, more preferably at 0.1 to 1.0 weight %, most preferably 0.3 to 2.0 weight % of the solids content with respect to the hydraulic binder, preferably cement. The solids content is determined in an oven at 60° C. until a constant weight of the sample is reached.

The invention also concerns the use of a hardening accelerator composition according to this invention in building material mixtures containing cement, calcium sulfate hemihydrate, anhydrite, slag, preferably ground granulated blast furnace slag, fly ash, silica dust, metakaolin, natural pozzolans and/or calcined oil shale, preferably in building material mixtures which contain substantially cement as a hydraulic binder.

Preferably the building material mixture contains more than 20 weight %, more preferably more than 40 weight %, most preferably more than 50 weight %, of cement with respect to the sum of the masses of all inorganic binders.

The invention also concerns building material mixtures containing a hardening accelerator composition according to this invention and cement, calcium sulfate hemihydrate, anhydrite, slag, preferably ground granulated blast furnace slag, fly ash, silica dust, metakaolin, natural pozzolans and/or calcined oil shale.

The invention also concerns a process for the preparation of a sprayable binder composition containing an inorganic binder selected from the group of cement, calcium sulfate hemihydrate, anhydrite, slag, preferably ground granulated blast furnace slag, fly ash, silica dust, metakaolin, natural pozzolans and/or calcined oil shale, water, aggregates and a set accelerator, characterized in that a hardening accelerator composition according to this invention is used.

EXAMPLES

1. Synthesis Examples of the Hardening Accelerators

All types and amounts of the starting materials (compounds i) to v)) used during the synthesis of the hardening accelerator samples are specified in table 1. As a preparation for the synthesis the solutions A, B and C were prepared as is described in the following:

Solution A:

$Al_2(SO_4)_3 \cdot 18 H_2O$ (compounds iii) and iv)) was dissolved in 200 ml of water. To this solution a comb polymer (compound v), typically as an aqueous solution of the polymer) was added. The total mass of this solution was adjusted to 400 g by adding water. This mixture (solution A) containing the compounds aluminum (iii)), sulfate (iv)) and comb polymer (v)) was transferred into a 1 liter glass reactor with a stirrer and a thermostat.

Separately were prepared:

Solution B:

A mixture of calcium hydroxide and calcium acetate (both compound i)) in water was prepared and the total mass of this suspension was adjusted to 250 g by adding water.

Solution C:

The commercial product Wollner Betol 39 (aqueous solution of sodium waterglass, compound ii)) was diluted in water. The total mass of the solution was adjusted to 200 g by the addition of water. Wollner Betol 39 is an aqueous 36 weight % solution of $Na_2Si_{3.4}O_{7.8}$.

During stirring, the solution A was pumped by a circuit through a mixing cell, equipped with a high shear mixer (IKA Ultra-Turrax, operated at 8,000 rpm). Directly into the high shear zone, the solutions B and C were added separately by peristaltic pumps with a constant pumping rate (g/min) within 20 minutes. The samples were then collected and the solid content was determined for each of them. The samples are milky white suspensions with a viscosity between 50 and 1000 mPas. They show no sedimentation within 3 months. Susp-9 to Susp-11 and Susp-4 are comparison examples, marked with (C) in table 1.

2. Testing of the Hardening Accelerators 2.1 Heat Flow Calorimetry

Heat flow calorimetry was carried out by means of isothermal calorimetry (equipment: TAM Air, the producer is TA Instruments). The measuring procedure was according to the recommendations of TA Instruments at 20° C.

Sample Preparation:

All sample materials were stored at controlled room temperature of 20° C. The measurements were done at a W/C of 0.5.

Mix A:

20.0 g cement (Holcim Fluvio 4 CEM II/A-LL) was placed into a mixing beaker. To be able to observe all effects (the initial reaction is quite fast) of the prepared accelerator suspensions, 0.045 g of tartaric acid was added to 20 g of the cement in order to retard the cement reaction. In this way it becomes possible to evaluate also the effect on the aluminate reaction (initial reaction) of the cement. This powder mixture was shaken to mix both components well.

Mix B:

An amount of the accelerator suspension containing 0.17 g of solids contents of the suspensions Susp-1 to Susp-9 (last column in table 1) is placed into another beaker and water is added until the total amount of water is 10.0 g. For example for the Susp-1 1.47 g of Susp-1 is added, this corresponds to 0.17 g of solid material. The respective amounts of the accelerating suspension (e.g. Susp-1) are summarized in table 2.

Mix A and B were mixed together for 90 seconds by means of a standard laboratory spatula. Subsequently an amount corresponding to 3.0 g of cement of the mix of A and B is placed into a plastic ampule and the plastic ampoule with the sample is mounted into the calorimeter, running isothermal at 20° C.

The reference for comparison (blank) is the Mix A, which does not contain the accelerator suspension of mix B. It is always measured in parallel to the accelerated mixtures to exclude effects like cement ageing.

The heat of hydration of the samples containing the accelerating suspension (e.g. Susp-1) after 1, 2 and 4 hours is compared to the heat of hydration of a blank sample, containing the same amount of cement, water and tartaric acid, but no accelerating Suspension. The relative heat

TABLE 1

Starting materials for synthesis of hardening accelerators

| Material No | Comb polymer | Comb[3] polymer [g] | Molar ratio $Si/SO_4^{2-}$ | $Al_2(SO_4)_3 \cdot 18H_2O$ [g] | $Na_2Si_{3.4}O_{7.8}$ [g] | $Ca(OH)_2$ [g] | $Ca(OAc)_2 \cdot H_2O$ [g] | Solid content of product [%] |
|---|---|---|---|---|---|---|---|---|
| Susp-1 | Poly-1[1] | 27 | 2.84 | 19.99 | 19.98 | 26.67 | 11.79 | 11.6 |
| Susp-2 | Poly-2[2] | 35 | 4.10 | 16.59 | 23.96 | 27.07 | 14.15 | 12.8 |
| Susp-3 | Poly-2[2] | 35 | 10.96 | 7.86 | 30.35 | 25.51 | 17.92 | 12.7 |
| Susp-4 (C) | Poly-1[1] | 35 | 1.84 | 24.63 | 15.97 | 27.1 | 9.43 | 12.2 |
| Susp-5 | Poly-2[2] | 35 | 25.18 | 3.9 | 34.61 | 25.72 | 20.43 | 13.1 |
| Susp-6 | Poly-2[2] | 35 | 6.48 | 11.66 | 26.62 | 25.56 | 15.72 | 12.5 |
| Susp.7 | Poly-1[1] | 50 | 2.76 | 39.73 | 38.70 | 52.6 | 22.85 | 22.37 |
| Susp-8 (C) | Poly-1[1] | 27 | 0.33 | 33.99 | 3.99 | 25.34 | 2.36 | 11.9 |
| Susp-9 (C) | Poly-2[2] | 35 | 0 | 37.75 | 0.00 | 25.18 | 0.00 | 10.61 |
| Susp-10 (C) | Poly-2[2] | 35 | — | 0.00 | 36.20 | 24.18 | 21.38 | 12.75 |
| Susp-11 (C) | Without | 0 | 10.98 | 7.86 | 30.42 | 26.89 | 20.18 | 12.47 |

[1]Poly-1 is a comb polymer based on the monomers maleic acid, acrylic acid and vinyloxybutylpolyethylene glycol-5800. The molar ratio of acrylic acid to maleic acid is 7. Mw = 40,000 g/mol as determined by GPC. The solids content is 45% by weight. The synthesis is, for example, disclosed in EP0894811. The charge density is 930 μeq/g.
[2]Poly-2 is a copolymer of methacrylic acid methylpolyethylene glycol (Mw 5,000 g/mol) ester and hydroxyethyl methacrylic acid phosphate, the solids content was 28 weight % and the Mw (measured via GPC) was 32,000 g/mol.
[3]The indication in g refers to the solid contents of the comb polymer (without water).

values given in table 2 are calculated by dividing the heat of hydration of the respective accelerating suspension containing sample (after the respective elapsed time) with the heat of hydration of the blank (after the respective time), this value is multiplied with 100%.

TABLE 2

Dosage of hardening accelerators and calorimetry results

| Example No | Dosage (g/20.0 g cement) | Material No | Heat after 1 h relative to blank (%) | Heat after 2 h relative to blank (%) | Heat after 4 h relative to blank (%) |
|---|---|---|---|---|---|
| 1 | 1.47 | Susp-1 | 122 | 137 | 179 |
| 2 | 1.33 | Susp-2 | 96 | 243 | 282 |
| 3 | 1.34 | Susp-3 | 181 | 243 | 382 |
| 4 (C) | 1.39 | Susp-4 (C) | 86 | 221 | 198 |
| 5 | 1.30 | Susp-5 | 134 | 238 | 375 |
| 6 | 1.36 | Susp-6 | 128 | 225 | 397 |
| 7 (C) | 1.43 | Susp-8 (C) | 74 | 105 | 147 |
| 8 (C) | 1.60 | Susp-9 (C) | 107 | 99 | 98 |
| 9 (C) | 1.33 | Susp-10 (C) | 53 | 88 | 199 |
| 10 (C) | 1.36 | Susp-11 (C) | 68 | 99 | 193 |

As an example for the heat flow calorimetry testing, the FIG. 1 shows the heat flow for three selected samples.

FIG. 1: Examples for Heat Flow Calorimetry

From FIG. 1 and the results of table 2 the advantage of the combined ettringite and calcium silicate hydrate accelerator becomes evident. The heat released from the system correlates directly with the progress of hydration and therefore with the strength development. While the suspension containing only calcium silicate hydrate (Susp-10 (comparison example), dashed line) shows only a slight increase of heat released by the system compared to the blank without any accelerator (straight line), the combined ettringite and calcium silicate hydrate accelerator (Susp-1, dotted line) shows a strong increase in heat released in the first 2-3 hours.

From table 2 it can be seen that the relative heat after 1, 2 and 4 hours is increased compared to the comparative examples. This is in particular true for the very early strength data at a time of 1 hour and 2 hours.

2.2 Setting of Mortar 450 g Holcim Fluvio 4 CEM II A/LL cement and 200 g water including 1.35 g of Glenium® Sky 587 superplasticizer were placed into a mixing bowl. Glenium® Sky 587 is a copolymer of acrylic acid and vinyloxybutylpolyethylene glycol –5800 and vinyloxybutylpolyethylene glycol –1,100. Mw is 40,000 g/mol, determined by GPC. It is obtainable from BASF Construction Chemicals Europe AG. The bowl is placed into a standard mortar mixer and the device is switched on at low speed for 30 s. After 30 s during constant mixing, 1,350 g of CEN Norm Sand is added during 30 s. The mixer is switched to high speed for 30 s.

After this procedure, the mixer is switched off for 90s and restarted at high speed for 60s. Now, 4% by weight of cement of the alkali free accelerator Meyco® SA167 (will be renamed as MasterRoc SA 167) and the respective accelerating suspension is added as fast as possible (this is time t=0 for the Vicat measurement) and mixed for 15 s, in the case of the example 1 (blank) no accelerator suspension is added.

The mould is filled immediately after the mixing. Compaction of the mortar is achieved by treatment of the mould by means of a vibration table for 30 s.

The mould is placed into an automatic Vicat needle machine (producer: TESTING, Berlin/Germany, interval 30 s). The time when the Vicat needle reaches no longer the bottom of the mould is recorded as initial setting time. The time when the Vivat needle is no longer able to penetrate the mortar at all is noted as final setting time. The measurement of the setting time was done according to EN-196-3.

MEYCO® SA 167 is a suspension type of alkali-free accelerators (sodium, potassium <1% $Na_2O$ equivalent) used for sprayed concrete applications. MEYCO®SA 167 is an aluminum hydroxysulfate based product with viscosity up to 1000 mPa*s and pH 2.5-3.5 It is obtainable from BASF Construction Chemicals Europe AG.

The results of the measurements are summarized in table 3. It can be seen that both the initial set and the final set are significantly improved with respect to the reference without the accelerator according to this invention.

TABLE 3

Results of mortar setting time test

| Example No. | Material | Initial Set (min) | Final Set (min) |
|---|---|---|---|
| 1 (only Meyco ® SA 167) | No accel. suspension (blank) | 20 | 30 |
| 2 | Susp-3 | 6 | 17 |
| 3 | Susp-7 | 13 | 20 |

2.3 Sprayed Concrete Testing

The following concrete mix design was used for the sprayed concrete testing:

Cement type CEM II/A-LL 42.5 N Fluvio 4 Siggenthal Holcim

Cement content: 450 kg/m³

W/C: 0.42 sand type A (0-4 mm): 70% sand type B: (4-8 mm): 30%

Plasticizer Glenium® SKY 587: 1.6% by weight of the cement

Surfynol®2502 (defoamer): 0.01% by weight of the cement

Delvocrete® stabilizer 10 (retarder): 0.2% by weight of the cement

MEYCO® SA 167 6% by weight of the cement

The accelerator suspensions were added on the concrete mixer truck.

The testing was conducted according to the following regulations:

PrEN 14488-1, Testing sprayed concrete—part 1: Sampling fresh and hardened concrete PrEN 14488-2, Testing sprayed concrete—part 2: Compressive strength of young sprayed concrete FIG. 2: Compressive Strength Development The compressive strength development for the sample according to this invention (with accelerator suspension 3) is clearly improved compared to the reference sample (without accelerator suspension). It is proved that also in the presence of an alkali free accelerator like SA167 significantly higher early compressive strength values can be obtained. In particular it becomes evident that already in the time region of one hour after preparing the concrete the compressive strength is roughly doubled compared to the reference and after 2 hours the compressive strength is already about six times higher. This excellent development of the early strength of sprayed concrete is a very important feature, which becomes possible by the use of the accelerators according to this invention. A safe and fast progress of the

The invention claimed is:

1. A process for the preparation of a calcium silicate hydrate and ettringite containing hardening accelerator composition in which cement is not used, which comprises reacting
   i) a water-soluble calcium compound,
   ii) a water-soluble silicate compound,
   iii) a water-soluble aluminum compound and
   iv) a water-soluble sulfate compound,
   wherein the molar ratio of silicon to sulfate is from 2/1 to 30/1 and the reaction of the four water-soluble compounds i) to iv) being carried out in the presence of v) an aqueous solution which contains a water-soluble comb polymer suitable as a plasticizer for hydraulic binders.

2. The process according to claim 1, wherein the ratio of the weight of water-soluble comb polymer suitable as plasticizer for hydraulic binders to the weight of calcium is from 0.5 to 5.

3. The process according to claim 1, wherein the water-soluble components i), ii), iii) and iv) are used in amounts that the hardening accelerator composition contains
   a) from 0.02 mol/l to 1.50 mol/l of calcium,
   b) from 0.005 mol/l to 0.75 mol/l of silicon,
   c) from 0.0025 to 0.17 mol/l of aluminum, and
   d) from 0.0025 to 0.375 mol/l of sulfate.

4. The process according to claim 1, wherein the molar ratio of calcium to sulfate is from 8/1 to 30/1.

5. The process according to claim 1, wherein the molar ratio of calcium to aluminum is from 9.1/1 to 30/1.

6. The process according to claim 1, wherein the molar ratio of aluminum to sulfate is from 0.3/1 to 1/1.

7. The process according to claim 1, wherein the weight percentage of e) water in the hardening accelerator is from 50% to 99%.

8. The process according to claim 1, wherein the i) water-soluble calcium compound is present as calcium chloride, calcium nitrate, calcium formate, calcium acetate, calcium bicarbonate, calcium bromide, calcium hydroxide, calcium sulfamidate, calcium oxide, calcium iodide, calcium lactate, calcium propionate, calcium sulfate, calcium sulfate hemihydrate, calcium sulfate dihydrate and/or calcium methansulfonate.

9. The process according to claim 8, wherein the i) water-soluble calcium compound is present as calcium sulfamidate, calcium acetate, calcium nitrate and/or calcium hydroxide.

10. The process according to claim 1, wherein the water-soluble silicate compound ii) is selected from a silicate with the formula m $SiO_2 \cdot n\ M_2O$, wherein M is Li, Na, K and/or $NH_4$, m and n are molar numbers and the ratio of m:n is from 0.9 to 4.

11. The process according to claim 10, wherein the ratio of m:n is from 0.9 to 3.8.

12. The process according to claim 1, wherein the water-soluble aluminum compound iii) is present as aluminum sulfate, basic aluminum sulfate, aluminum nitrate and/or alkaline metal aluminate.

13. The process according to claim 1, wherein the iv) water-soluble sulfate compound is present as aluminum sulfate, alkaline metal sulfate and/or alkaline earth metal sulfate.

14. The process according to claim 1, wherein the pH-value is higher than 7.

15. The process according to claim 1, wherein the water-soluble comb polymer comprises anionic and/or anionogenic groups and polyether side chains.

16. The process according to claim 15, wherein the water-soluble comb polymer comprises as anionic or anionogenic group at least one structural unit of the general formulae (Ia), (Ib), (Ic) and/or (Id):

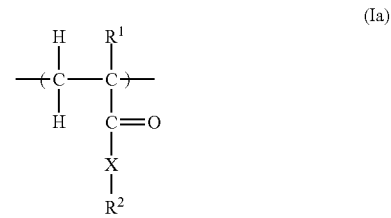

in which
$R^1$ is H or an unbranched or branched $C_1$-$C_4$ alkyl group, $CH_2COOH$ or $CH_2CO$—X—$R^2$;
X is $NR^7$—$(C_nH_{2n})$ or O—$(C_nH_{2n})$ with n=1, 2, 3 or 4, where the nitrogen atom or the oxygen atom is bonded to the CO group;
$R^2$ is $PO_3M_2$, O—$PO_3M_2$, $(C_6H_4)$—$PO_3M_2$ or $(C_6H_4)$—$OPO_3M_2$; or X is a chemical bond and $R^2$ is OM;
$R^7$ is H, $C_1$-$C_6$ alkyl, $(C_nH_{2n})$—OH, —$(C_nH_{2n})PO_3M_2$, —$(C_nH_{2n})$—$OPO_3M_2$, $(C_6H_4)$—$PO_3M_2$, $(C_6H_4)$—$OPO_3M_2$ or $(C_nH_{2n})$—O-$(AO)_a$—$R^9$;
A is the same or different and is independently from each other $C_xH_{2x}$ with x=2, 3, 4 or 5 or is $CH_2CH(C_6H_5)$,
α is an integer from 1 to 350; and
$R^9$ is H or an unbranched or branched $C_1$-$C_4$-alkyl group;
n is 1, 2, 3, or 4,

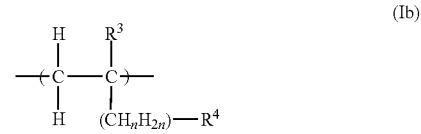

in which
$R^3$ is H or an unbranched or branched $C_1$-$C_4$ alkyl group;
n is 0, 1, 2, 3 or 4;
$R^4$ is $PO_3M_2$, or O—$PO_3M_2$;

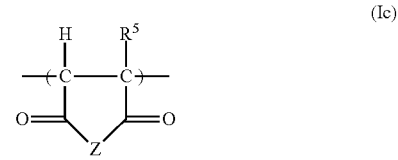

in which
$R^5$ is H or an unbranched or branched $C_1$-$C_4$ alkyl group;
Z is O or $NR^7$;
$R^7$ is H, $(C_nH_2O)$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4;

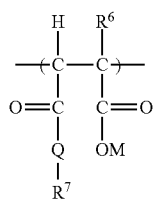

(Id)

in which
R⁶ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$, or $(C_nH_{2n})$—O-$(AO)_a$—$R^9$;
A is the same or different and is independently from each other $C_xH_{2x}$ with x=2, 3, 4 or 5 or is $CH_2CH(C_6H_5)$,
α is an integer from 1 to 350; and
$R^9$ is H or an unbranched or branched $C_1$-$C_4$-alkyl group,
n is 1, 2, 3, or 4,
and where each M independently of any other is H or a cation equivalent.

17. The process according to claim 1, wherein the water-soluble comb polymer comprises as polyether side chain at least one structural unit of the general formulae (IIa), (IIb), (IIc) and/or (IId):

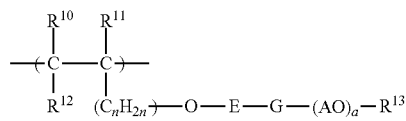

(IIa)

in which
$R^{10}$, $R^{11}$ and $R^{12}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is the same or different and is independently from each other $C_xH_{2x}$ with x=2, 3, 4 or 5 or is $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;

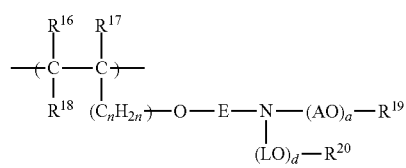

(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;

A is the same or different and is independently from each other $C_xH_{2x}$ with x=2, 3, 4 or 5 or is $CH_2CH(C_6H_5)$, is $C_xH_{2x}$ with x=2, 3, 4 or 5, or is $CH_2CH(C_6H_5)$;
n is 0, 1, 2, 3, 4 and/or 5;
L is the same or different and is independently from each other $C_xH_{2x}$ with x=2, 3, 4 or 5, or is $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched $C_1$-$C_4$ alkyl group; and
n is 0, 1, 2, 3, 4 or 5;

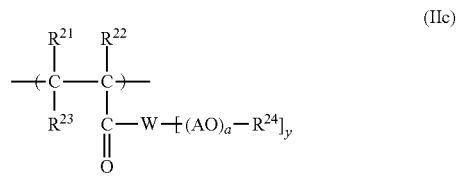

(IIc)

in which
$R^{21}$, $R^{22}$ and $R^{23}$ independently of one another are H or an unbranched or branched $C_1$-$C_4$ alkyl group;
W is O, $NR^{25}$, or is N;
Y is 1 if W=O or $NR^{25}$, and is 2 if W=N;
A is $C_xH_{2x}$ with x=2, 3, 4 or 5, or is $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

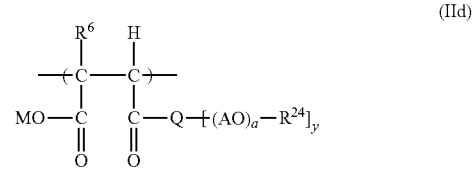

(IId)

in which
$R^6$ is H or an unbranched or branched $C_1$-$C_4$ alkyl group;
Q is $NR^{10}$, N or O;
Y is 1 if Q=O or $NR^{10}$ and is 2 if Q=N;
$R^{10}$ is H or an unbranched or branched $C_1$-$C_4$ alkyl group;
$R^{24}$ is H or an unbranched or branched $C_1$-$C_4$-alkyl group;
A is the same or different and is independently from each other $C_xH_{2x}$ with x=2, 3, 4 or 5, or is $CH_2C(C_6H_5)H$;
a is an integer from 2 to 350
and where each M independently of any other is H or a cation equivalent.

18. The process according to claim 1, wherein the water-soluble comb polymer is a polycondensation product comprising structural units (III) and (IV):

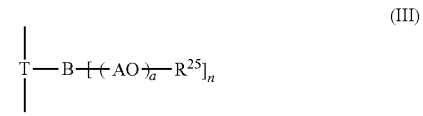

(III)

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;

n is 1 or 2;

B is N, NH or O, with the proviso that n is 2 if B is N and with the proviso that n is 1 if B is NH or O;

A is the same or different and is independently from each other $C_xH_{2x}$ with x=2, 3, 4 or 5, or is $CH_2CH(C_6H_5)$;

a is an integer from 1 to 300;

$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;

where the structural unit (IV) is selected from the structural units (IVa) and (IVb):

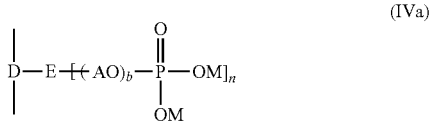

(IVa)

in which

D is a substituted or unsubstituted phenyl or naphthyl radical or a substituted or unsubstituted heteroaromatic radical having 5 to 10 ring atoms, of which 1 or 2 atoms are heteroatoms selected from N, O and S;

E is N, NH or O, with the proviso that n is 2 if E is N and with the proviso that n is 1 if E is NH or O;

A is the same or different and is independently from each other $C_xH_{2x}$ with x=2, 3, 4 or 5, or is $CH_2CH(C_6H_5)$;

b is an integer from 1 to 300 and where each M independently of any other is H or a cation equivalent;

(IVb)

in which

V is a substituted or unsubstituted phenyl or naphthyl radical and is optionally substituted by 1 or two radicals selected from $R^8$, OH, $OR^B$, $(CO)R^8$, COOM, $COOR^8$, $SO_3R^8$ and $NO_2$;

$R^7$ is COOM, $OCH_2COOM$, $SO_3M$ or $OPO_3M_2$;

M is independently of any other H or a cation equivalent; and $R^8$ is $C_1$-$C_4$ alkyl, phenyl, naphthyl, phenyl-$C_1$-$C_4$ alkyl or $C_1$-$C_4$ alkylphenyl.

19. The process according to claim 1, wherein the calcium silicate hydrate and ettringite containing aqueous hardening accelerator composition is dried in a subsequent process step.

20. A hardening accelerator composition obtainable by the process according to claim 1.

21. A building material mixture comprising the hardening accelerator composition according to claim 20 and cement, calcium sulfate hemihydrate, anhydrite, slag, fly ash, silica dust, metakaolin, natural pozzolans and/or calcined oil shale.

22. A process for the preparation of a sprayable binder composition comprising an inorganic binder selected from the group of cement, calcium sulfate hemihydrate, anhydrite, slag, fly ash, silica dust, metakaolin, natural pozzolans and/or calcined oil shale, water, aggregates and a set accelerator, wherein the hardening accelerator composition according to claim 20 is used.

* * * * *